(12) United States Patent
Downing et al.

(10) Patent No.: US 6,607,458 B2
(45) Date of Patent: Aug. 19, 2003

(54) TECHNIQUES FOR ROBUST ENDLESS BELT TRACKING CONTROL

(75) Inventors: Steven P Downing, Camas, WA (US); Wade A. Powell, Vancouver, WA (US); Edward Louis Feldhousen, Tualatin, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 45 days.

(21) Appl. No.: 09/866,354

(22) Filed: May 24, 2001

(65) Prior Publication Data

US 2002/0193191 A1 Dec. 19, 2002

(51) Int. Cl.⁷ ................................................ F16H 7/22
(52) U.S. Cl. ...................................... 474/102; 399/165
(58) Field of Search .............................. 474/102, 103, 474/110; 347/104; 399/165, 301, 302

(56) References Cited

U.S. PATENT DOCUMENTS

| | | | | |
|---|---|---|---|---|
| 4,485,982 A | * | 12/1984 | St. John et al. | 101/484 |
| 4,577,953 A | * | 3/1986 | Narukawa | 399/162 |
| 4,959,040 A | | 9/1990 | Gardner et al. | 474/103 |
| 5,096,044 A | * | 3/1992 | Biebel | 198/502.4 |
| 5,153,655 A | | 10/1992 | Suzuki et al. | 355/285 |
| 5,157,444 A | | 10/1992 | Mori et al. | 355/282 |
| 5,479,241 A | | 12/1995 | Hou et al. | 355/212 |
| 5,510,877 A | | 4/1996 | deJong et al. | 355/208 |
| 5,519,230 A | | 5/1996 | Hubble, III et al. | 250/559.36 |
| 5,565,965 A | | 10/1996 | Costanza et al. | 355/212 |
| 5,568,172 A | * | 10/1996 | Cowger | 347/19 |
| 5,964,339 A | | 10/1999 | Matsuura et al. | 198/810.03 |
| 6,126,512 A | | 10/2000 | Chao et al. | 451/9 |
| 6,134,406 A | | 10/2000 | Moe et al. | 399/165 |
| 6,311,539 B1 | * | 11/2001 | Yeo et al. | 226/3 |

* cited by examiner

Primary Examiner—Thomas R. Hannon
Assistant Examiner—Vicky A. Johnson

(57) ABSTRACT

A belt tracking system for an endless belt having left and right opposed edges, the belt driven in a first direction by a belt drive system. The tracking system includes a set of periodic belt indicia formed on the belt along one or more axes aligned with the first direction. A sensor system tracks movement of the belt in a lateral direction transverse to the first direction and senses the set of belt indicia to provide sensor system signals. An actuator system effects movement of the belt in the lateral direction, the actuator system responsive to the sensor system signals for nominally maintaining a position of the belt relative to the transverse direction. A controller is responsive to the sensor system signals for detecting that the belt has tracked outside an allowable belt movement range and taking protective actions to prevent the belt from damage due to undesired lateral tracking movement. A belt indicia sensor can optionally be employed to calibrate a belt drive system.

32 Claims, 11 Drawing Sheets

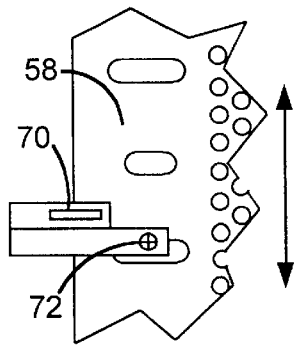
FIG. 4E
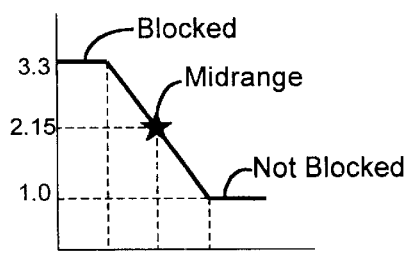
FIG. 5E
FIG. 6E
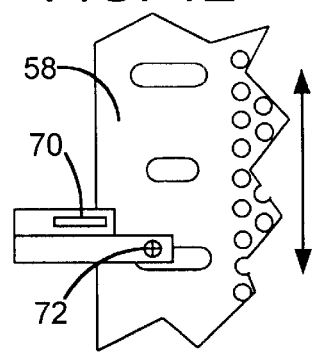
FIG. 4F
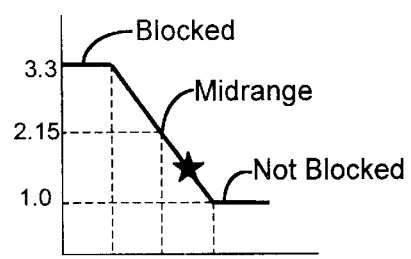
FIG. 5F
FIG. 6F
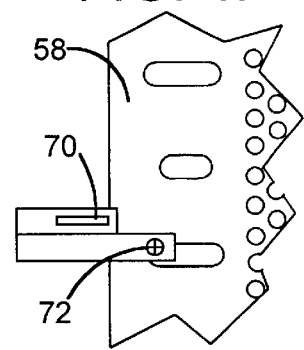
FIG. 4G
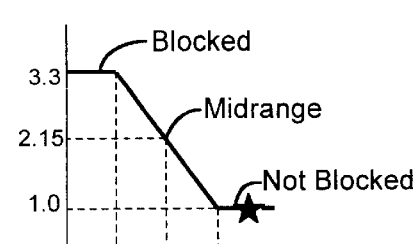
FIG. 5G
FIG. 6G
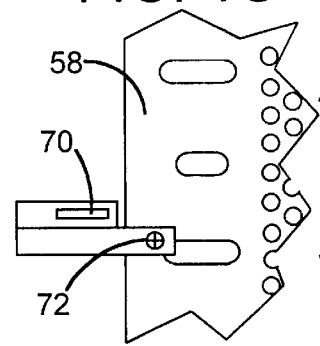
FIG. 4H
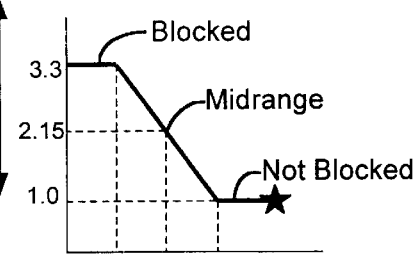
FIG. 5H
FIG. 6H

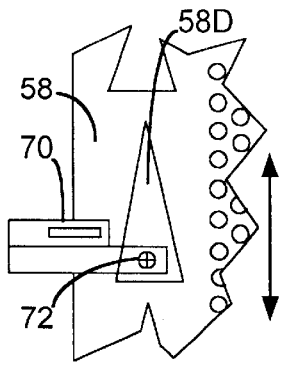
FIG. 7
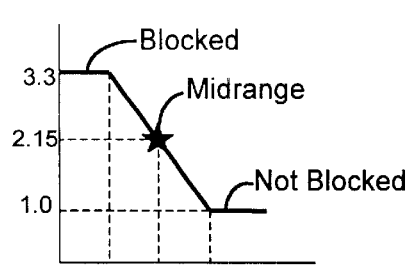
FIG. 8A
FIG. 9A
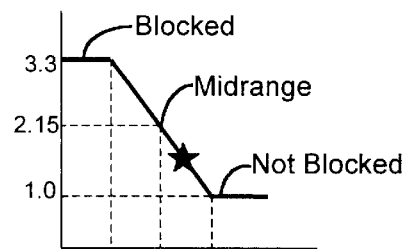
FIG. 8B
FIG. 9B
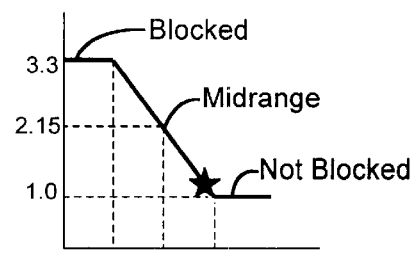
FIG. 8C
FIG. 9C
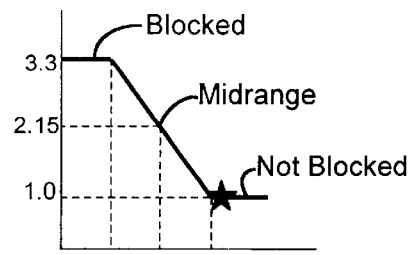
FIG. 8D
FIG. 9D

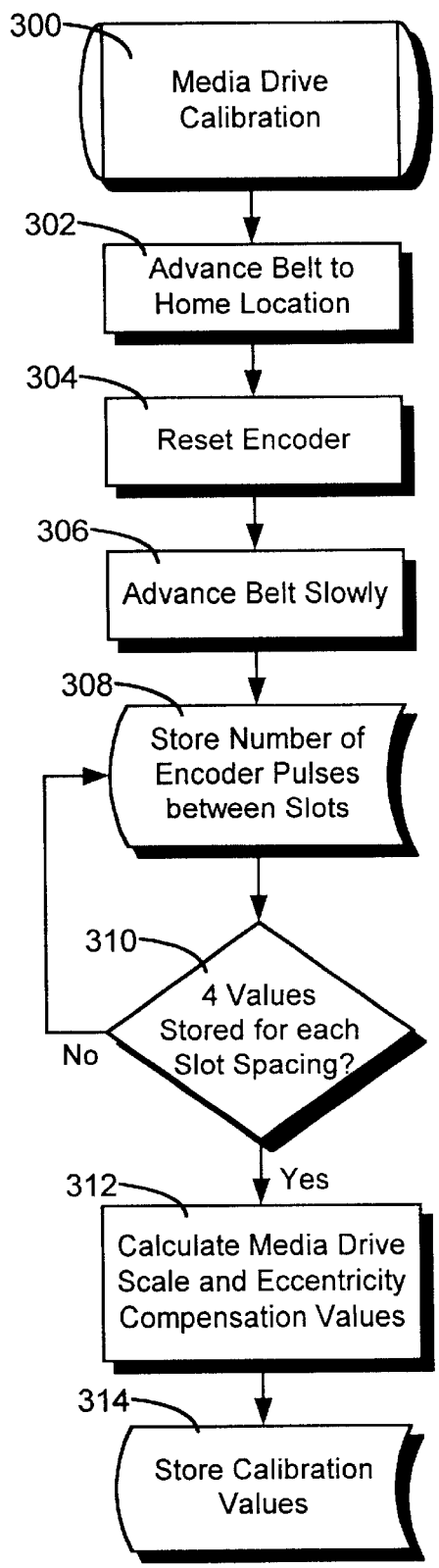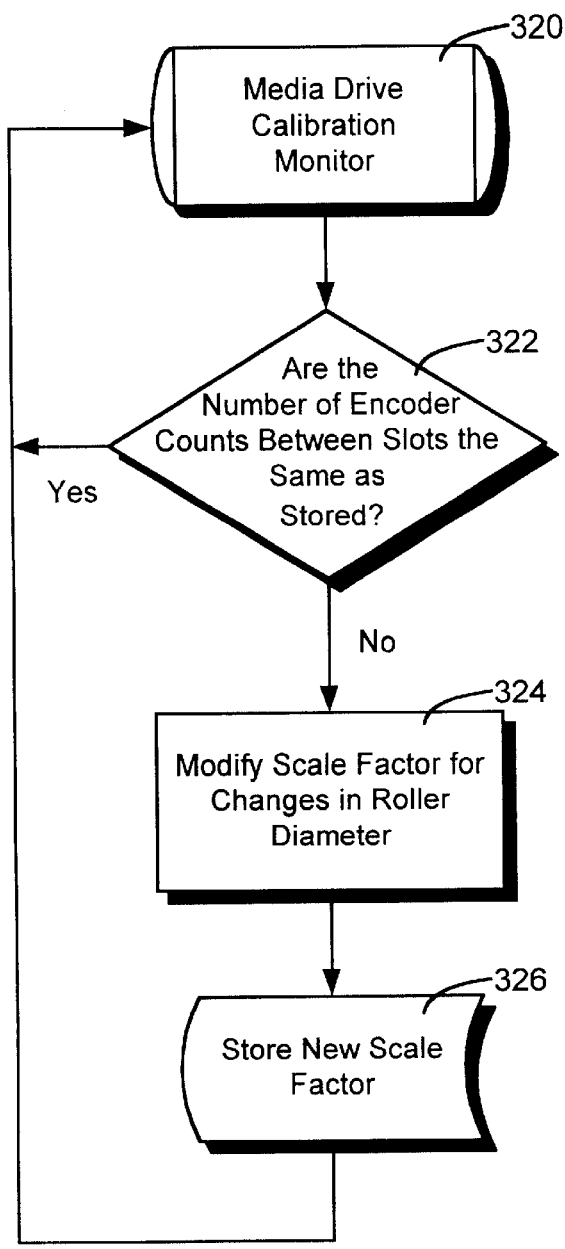
FIG. 11A
FIG. 11B

TECHNIQUES FOR ROBUST ENDLESS BELT TRACKING CONTROL

TECHNICAL FIELD OF THE DISCLOSURE

This invention relates to belt drives, and more particularly to techniques for tracking the belt.

BACKGROUND OF THE DISCLOSURE

Endless belt drives find utility in number of different applications. One exemplary application is that of paper/media handling systems, e.g. in an inkjet printer. The belt drive can be used to move the print media along a media path for inkjet printing in an exemplary application. The belt is positioned over rollers and platen surfaces. There is a need to track the lateral position of the belt in order to properly control it for good image quality, and to prevent damage to the belt and other machine components in the event of a malfunction. The belt needs to be controlled from running off the rollers and becoming damaged.

SUMMARY OF THE DISCLOSURE

In accordance with one aspect of the invention, a belt tracking system is described for an endless belt mounted on a roller system, the belt driven in a first direction by a belt drive system. The tracking system includes a set of periodic belt indicia formed on the belt along one or more axes aligned with the first direction. A sensor system tracks movement of the belt in a lateral direction transverse to the first direction and senses the set of belt indicia to provide sensor system signals. An actuator system effects movement of the belt in the lateral direction, the actuator system responsive to the sensor system signals for nominally maintaining a position of the belt relative to the transverse direction. A controller is responsive to the sensor system signals for detecting that the belt has tracked outside an allowable belt movement range and taking protective actions to prevent the belt from damage due to undesired lateral tracking movement.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 4A–4H are diagrammatic illustrations of eight different states of the belt in relation to the analog tracking sensor and the belt indicia sensor.

FIGS. 5A–5H are graphs depicting analog values of the analog tracking sensor output for the eight states depicted in FIGS. 4A–4H.

FIGS. 6A–6H are respective diagrams illustrating the output of the belt indicia sensor for the eight states depicted in FIGS. 4A–4H.

FIG. 7 illustrates an alternate belt indicia, a series of triangular slots are arranged along the edge of the belt.

FIGS. 8A–8D are respective diagrams illustrating the output of the tracking sensor for different states of a system employing the alternate belt indicia of FIG. 8.

FIGS. 9A–9D are respective diagrams illustrating the output of the belt indicia sensor for the states depicted in FIGS. 8A–8D.

FIG. 11A illustrates an exemplary media drive calibration routine in accordance with an aspect of the invention.

FIG. 11B is a flow diagram of an exemplary media drive calibration monitor procedure employing calibration data obtained during the media drive calibration routine of FIG. 11A.

DETAILED DESCRIPTION OF THE DISCLOSURE

Figure 1:
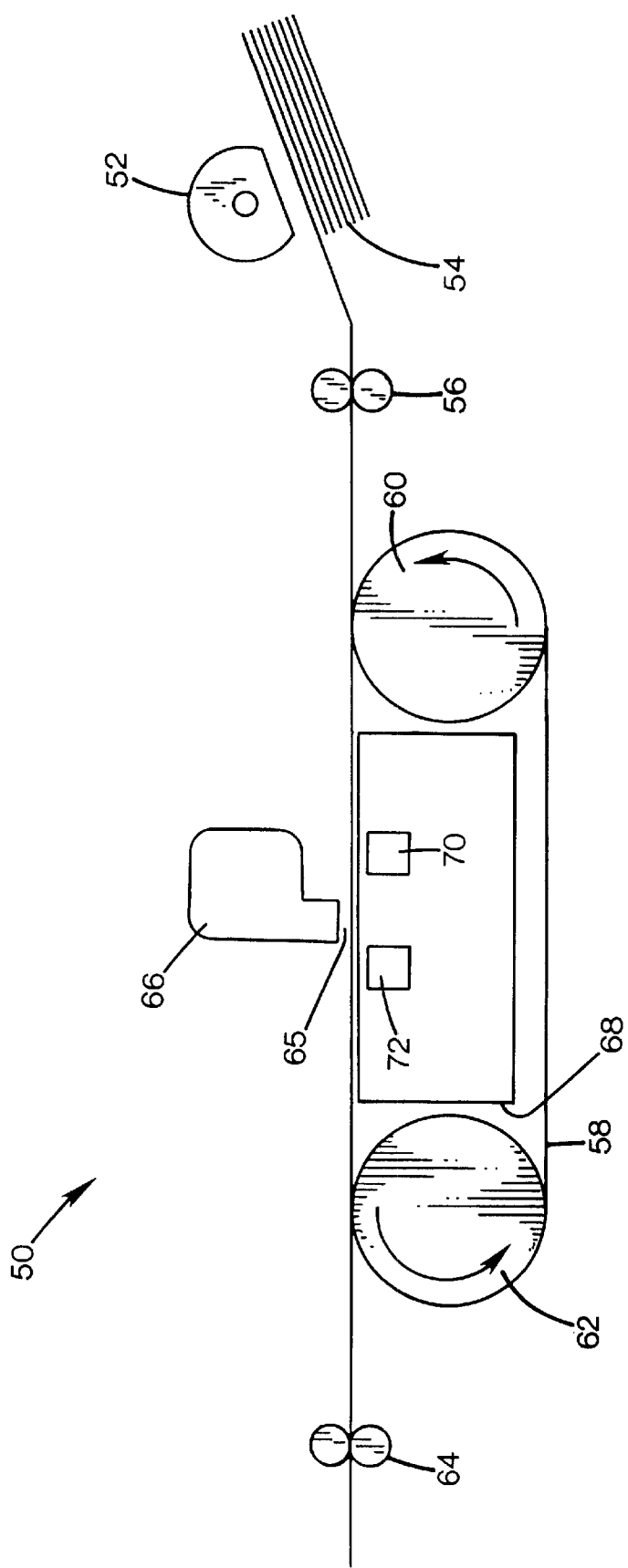
FIG. 1 is a diagrammatic side view of elements of an ink-jet printer embodying aspects of this invention.

FIG. 1 illustrates aspects of an ink-jet printer 50 using an endless belt or web 58 to provide the media positioning drive. A motor driven pick roller 52 is activated to pick a sheet of the print media from an input source 54, and pass it into the nip between drive roller set 56. The print media may be any type of suitable material, such as paper, cardstock, transparencies, photographic paper, fabric, mylar, metalized media, and the like, but for convenience, the illustrated embodiment is described using paper as the print medium. The invention is also applicable to roll-fed media as well.

The print medium is advanced onto an endless perforated belt or web transport 58, mounted for rotation on belt rollers 60, 62. In an exemplary embodiment, the belt is a thin layer, e.g. 4–5 mils in thickness, fabricated of a steel alloy having high nickel content, and preferably has a very low coefficient of thermal expansion. An exemplary material is marketed as INVAR (TM) steel, by Carpenter Steel Company. One or both of the rollers 60, 62 can be selectively motor-driven in either a clockwise or counter-clockwise direction which allows the belt to move in either direction, to position the sheet relative to the print zone 65 under the printing element system or print engine, represented here by ink-jet printhead 66. The print engine, for the example of an ink-jet printer, can comprise a single printhead for emitting a single monochrome ink, a plurality of printheads emitting ink droplets of different colored inks, a printhead with multiple ink nozzle arrays for emitting a plurality of inks of different colors, by way of example. The belt or web 58 is in fluid communication with vacuum platen 68 by, for example a plurality of apertures 58A formed through the belt or web. In this manner, a print medium can be held against the belt 58 for the span of the length of the platen and can be moved to and from the print zone 65. The exiting sheet is passed through the nip formed by output roller set 64 to an output tray (not shown).

The invention is not limited to use in an ink-jet printer, and has utility for many other applications, including without limitation other types of printers and machines employing media handling systems, including, for example, facsimile machines, scanners, and multi-function machines which combine two or more functions, e.g. print, scan, copy or facsimile. The invention also has application in other types of systems employing endless belts or webs, including, by way of example only, belt sanders, which have a need for maintaining lateral, side-to-side belt tracking.

As the belt 58 is driven, various factors will contribute to motion of the belt in a direction transverse to the media drive direction, including, by way of example, tapered belt rollers, belts with edges of different lengths, and out-of-plane or non-parallel rollers. This transverse motion is detrimental to print quality, and can lead to damage to the belt or surrounding printer structures, if the belt runs off the roller or collides with other structures. To control the tracking motion of the belt, the printer 50 includes a belt tracking system including a tracking actuator or motor 84, which moves the belt laterally under precision control. There are a number of different tracking systems which can be used to induce lateral movement in the belt. In this exemplary embodiment, the tracking motor 84 adjusts the belt rollers 60, 62 in such a way to cause the belt to traverse in a direction transverse to the media feed direction.

The printer 50 also includes a tracking sensor 70 and a belt indicia sensor 72. The tracking sensor in an exemplary embodiment provides an analog output signal employed by the printer controller in a feedback loop with the tracking motor 84 to maintain the belt position side-to-side, i.e. to keep the belt from traversing side-to-side in a direction transverse to the media advance direction. The feedback loop is generally shown in the schematic block diagram of FIG. 2B, wherein the belt tracking motor 84 receives drive signals from the controller 100, to affect the side-to-side position of the belt 58. The belt side-to-side position within a limited range is sensed by the tracking sensor 70, whose output signal is monitored by the controller 100 and used to determine the proper motor drive signals to be provided to the motor 84.

In an exemplary embodiment, the sensor 70 includes a light source, in this example an LED, an LED driver, and a photoreceptor or receiver which produces a sensor output dependent on the amount of incident light. The light source is positioned above the top surface of the belt, the photoreceptor below the bottom surface of the belt, so that the belt in some lateral positions can block the light generated by the light source from reaching the photoreceptor. The output of the sensor for an exemplary embodiment is inversely related to the amount of light incident on the sensor photoreceptor, e.g. at the light off condition, the sensor output is 3.3 volts in this exemplary embodiment, although other sensors may provide an output whose magnitude rises with increasing intensity of incident light. The LED driver can be controlled by increasing the drive, i.e. the pulse width modulation (PWM) of the LED, increasing the intensity of light generated by the light source, until the output reaches a minimum value, e.g. 1 volt in this embodiment. Nominally the PWM is some value, e.g. 15%, to produce an analog tracking sensor output value of 1 volt when the sensor is not blocked by the belt 58, i.e. the "non-blocked" sensor value.

Figure 3:
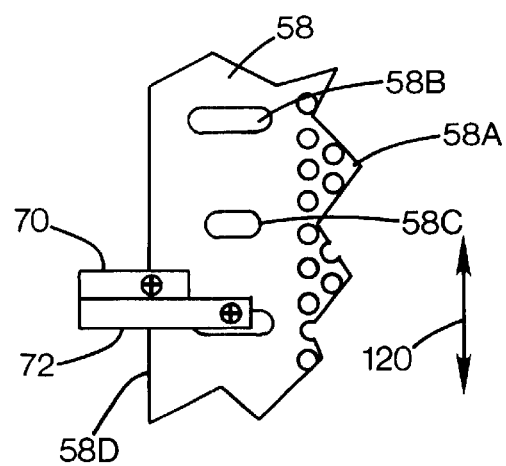
FIG. 3 is a diagrammatic top view of a portion of the system of FIG. 1, showing a portion of the belt with slots formed therein and the relationship of the tracking sensor and the belt indicia sensor.

The belt indicia sensor is adapted to sense indicia 58B, 58C (FIG. 3) associated with the belt 58. In this example, the indicia comprise slots formed through the belt transverse to the media drive direction. Alternatively, the indicia can be formed by imprinting the indicia on the belt surface, embedding the indicia within the belt, or by any other indicia associating technique. The sensor 72 can be an optical sensor for optically sensing the indicia, or a magnetic transducer for sensing the indicia, by way of example. One preferred technique is to apply or etch a pattern of encoder markings along the interior belt surface in a position such that the markings pass through the field of view of an optical sensor serving as the transducer 72. Alternative encoding techniques can also be employed, including magnetoresistive and capacitive encoding and sensing techniques. Moreover, for an optical sensor system, either transmissive or reflective systems can be employed.

By way of example only, the Y1567 photo interrupter module (including an LED light source and a receiver), marketed by the Electronics Devices Division, Electronic Components Group, Sharp Corporation, can be used or adapted for use in this application for the function of sensor 72 as well as sensor 70.

Figure 2A:
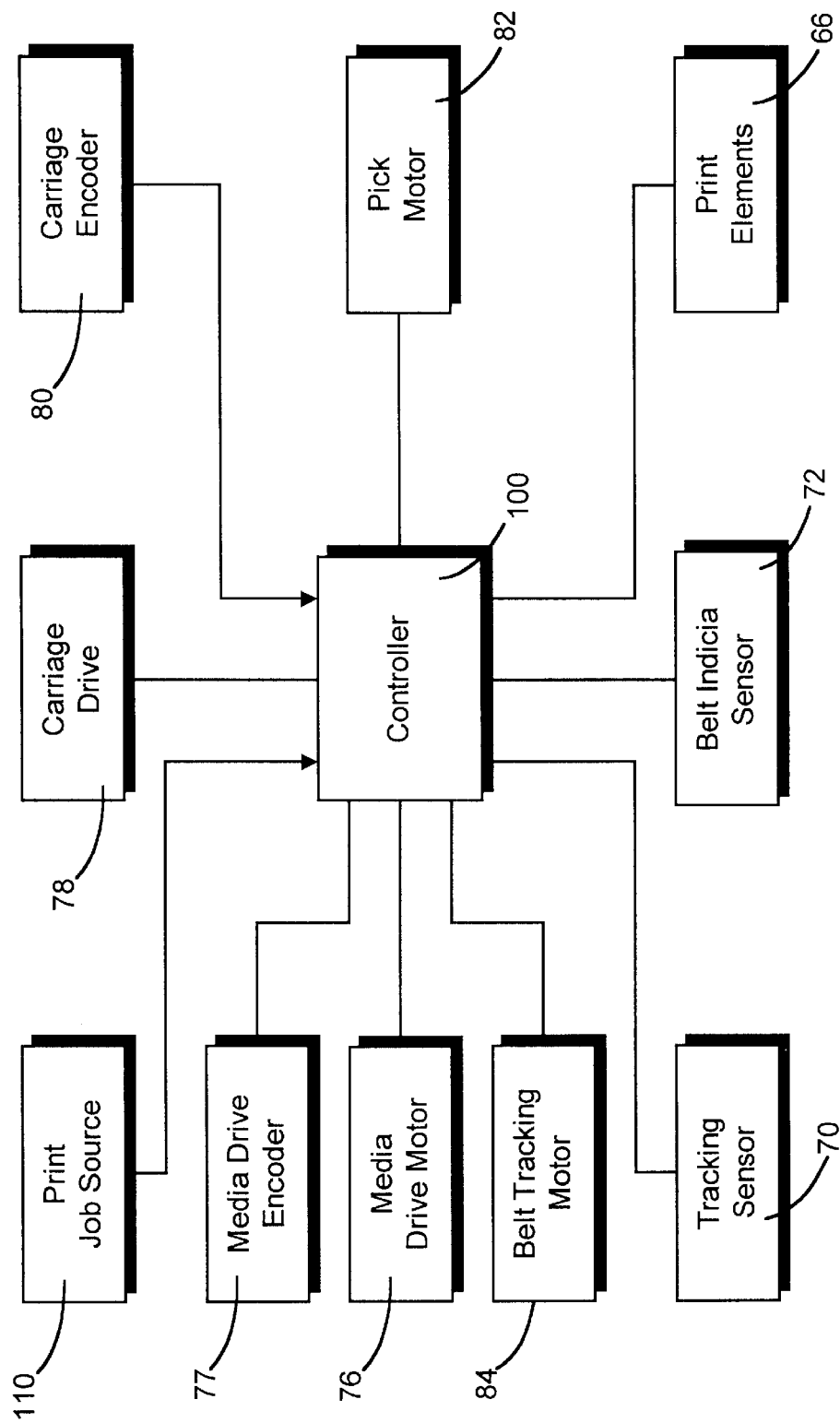
FIG. 2A is a schematic block diagram of elements of the ink-jet printer of FIG. 1.
Figure 2B:
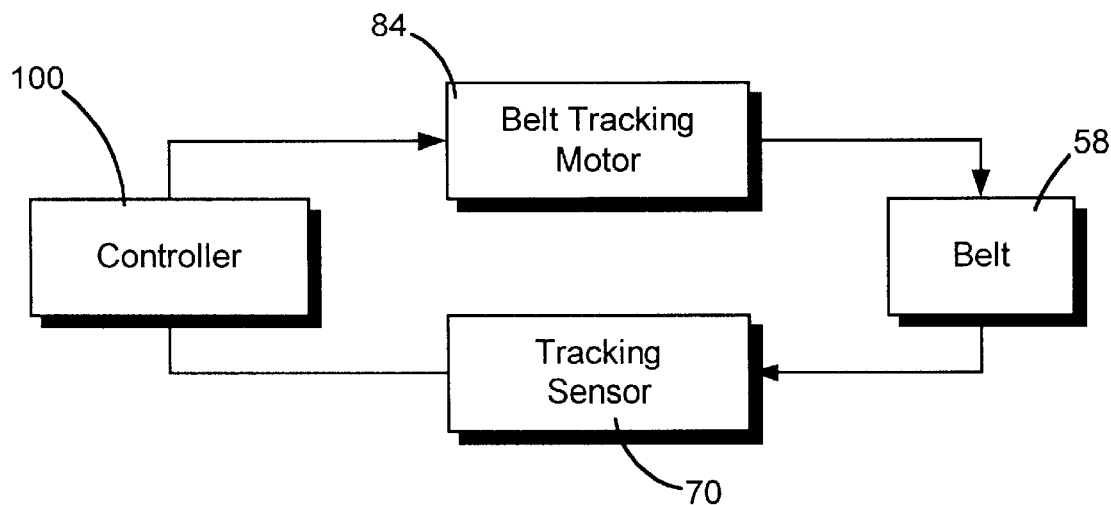
FIG. 2B is a simplified schematic diagram of a feedback loop implemented in the system of FIG. 1 to control the belt tracking movement.

FIG. 2A is a schematic block diagram of the control system for the printer of FIG. 1. A controller 100 such as a microcomputer or ASIC receives print job commands and data from a print job source 110, which can be a personal computer, digital camera or other known source of print jobs. The controller acts on the received commands to activate the pick roller motor 82 to actuate roller 52 to pick a sheet from the input tray 54, advance the sheet to the nip between the drive roller and pinch roller set 56, activate the drive motor system 76 to advance the sheet onto the belt 58, and drive the roller 62 to move the belt along a media path to advance the sheet to the print zone. The carriage drive 78 is driven by the controller to position the carriage holding the printing elements 66 for commencement of a print job, and to scan the carriage in a direction transverse to the media path. The invention can also be employed in page-wide printing systems, wherein the printhead extends across the width of the page so that a scanning carriage is not needed. Firing pulses are sent to the printhead(s) comprising the pen(s) 66. The controller receives encoder signals from the carriage encoder 80 to provide position data for the carriage. The controller is programmed to advance incrementally the sheet using the media drive motor 76 and the belt 58 to position the sheet for successive swaths, and to eject the completed sheet into the output tray. In the alternate case of a page-wide printer, the belt can run continuously, without the need for starting and stopping for each swath.

In this embodiment, the slots alternate between wide and narrow slots every ½ inch. The wide slots in this exemplary embodiment are about 1 mm high in the media or belt advance direction by 5 mm in the transverse carriage scan direction, i.e. the direction in which the printer carriage is driven, and the narrow slots are about 1 mm high by 3.8 mm. The narrow slot width represents the usable range for the analog tracking sensor 70 (plus some margin). The wide slot width represents the allowable belt movement (minus some margin), i.e. the wide slot width in the scan direction determines how far the belt can travel in the lateral direction before a technician should be called. This eliminates the need for plus and minus belt limit sensors and gives additional information about where the belt is on power-up if the belt is not in normal operating range.

One function of the belt indicia sensor 72 is to assure that the belt is fully off of the analog tracking sensor 70 before the tracking sensor is calibrated. There are several failure modes that would allow the belt to be tracked off of the roller and into other printer structures, thus damaging the belt. Examples of failure modes include non-uniform belt tension, non-parallel rollers, and non-uniform drag or friction on the belt. The use of the belt indicia sensor 72 can eliminate these failures.

Figure 10A:
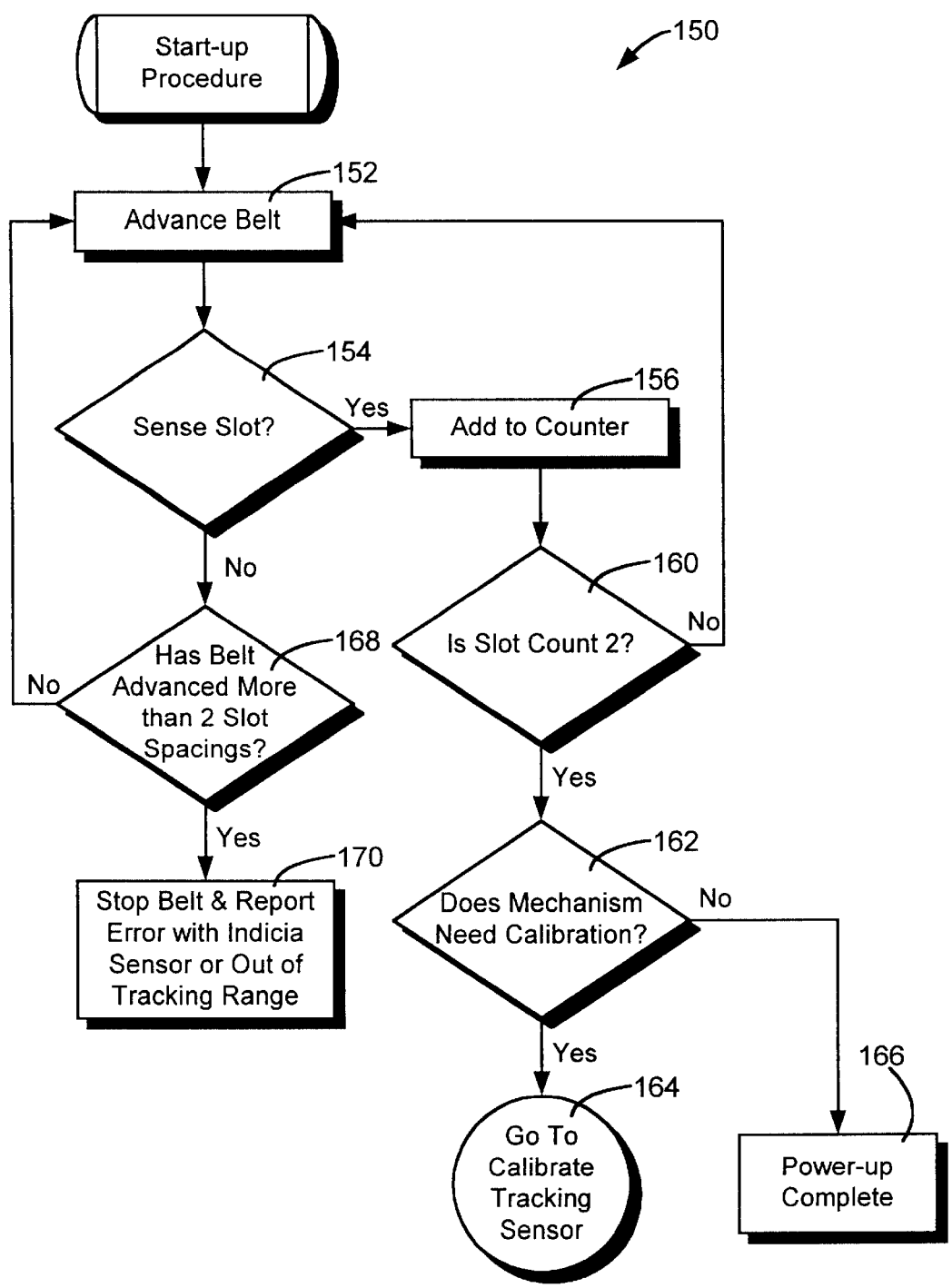
FIG. 10A is a flow diagram illustrating an exemplary start-up procedure in accordance with an aspect of the invention.
Figure 10B:
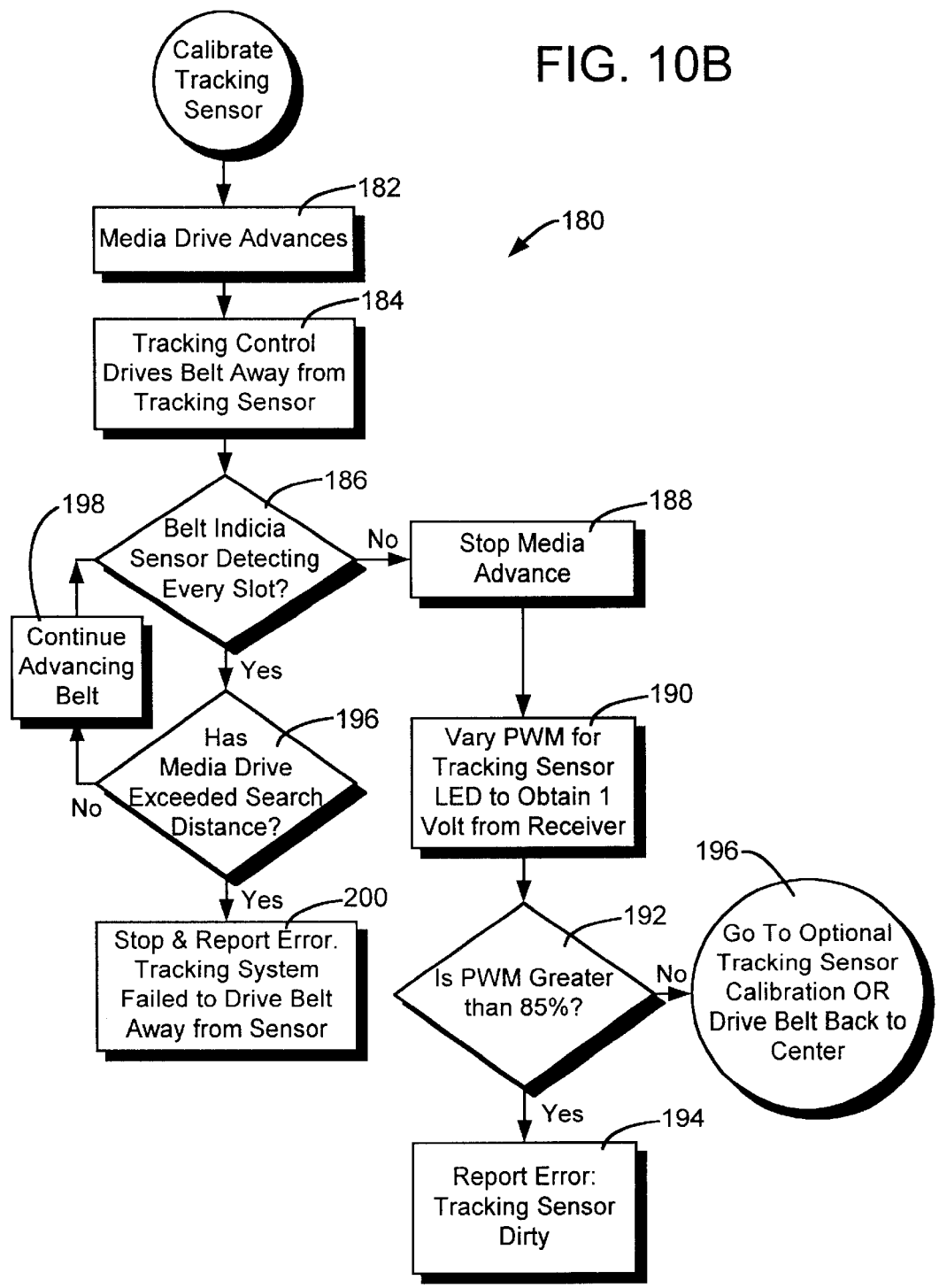
FIG. 10B is a flow diagram illustrating an exemplary tracking sensor calibration mode.

FIGS. 10A–10E illustrate exemplary modes of the printing system in accordance with aspects of the invention. FIG. 10A illustrates an exemplary start-up procedure 150 to be performed as part of the printing system start-up routine. On power up of the printer, the media advance system is commanded to move the belt forward some distance, e.g. two belt slot spacings forward. During the move, the belt indicia sensor 72 should transition from on to off or off to on. If not, either the sensor is not working or the belt was not installed properly, and an error is reported. Thus, at step 152, the belt is advanced. If a slot is sensed at 154, a counter is incremented (156), and if the slot count is two at 160, operation proceeds to step 162. If the tracking mechanism needs calibration, operation proceeds at 164 to the tracking sensor calibration mode (FIG. 10B). If calibration is not needed, power-up is completed at 166. If a slot is not detected at 154, operation branches to step 152 to move the belt another increment if the belt has not been advanced more than two slot spacings. The belt travel can be determined by an encoder on the belt drive, e.g. reading the rotation of a drive roller, or by another sensor. If the belt has been advanced more than two slot spacings, the belt drive is stopped, and an error is reported, indicating either a belt indicia error or that the belt is out of tracking range of the tracking sensor.

If, on power up of the printer, the belt indicia sensor 72 is operating correctly (FIG. 10A), the tracking sensor can be calibrated (FIG. 10B). The belt tracking motor 84 is commanded to move the belt 58 away from the sensor 72 as the belt is advanced (paper advance motor) until the belt indicia sensor 72 starts to detect every other slot. At this point the belt 58 has moved out from under the analog tracking sensor 70. If the belt indicia sensor 72 continues to detect every slot for more than a predetermined advance distance, e.g. a predetermined number of revolutions of the drive roller, then the belt tracking system is not driving the belt away from the sensor correctly. In this case, operation is stopped and an error is reported. An exemplary routine 180 for calibrating the tracking sensor is illustrated in FIG. 10B. The motor 82 is commanded to advance the belt (step 182), and the tracking drive is commanded to drive the belt away from the tracking sensor (step 184). If the belt indicia sensor 72 is detecting every slot (step 186), the belt continues advancing (step 198) if the media advance has not exceeded the predetermined search distance. If the media drive has exceeded the search distance, and the belt indicia sensor is still detecting every slot, then at step 200, the media drive is stopped, and a tracking system error is reported, indicating that the tracking system has failed to drive the belt away from the tracking sensor. If the belt sensor is not detecting every slot at 186, then the media advance is stopped at 188. The PWM for the tracking sensor 70 is varied to obtain a predetermined output from the tracking sensor receiver, e.g. 1 volt for this embodiment (step 190). If the PWM is greater than some predetermined threshold, e.g. 85% (step 192), then at 194 an error is reported, indicating that the tracking sensor is dirty. If the PWM is not greater than the threshold, then operation either proceeds at 196 to an optional tracking sensor calibration (FIG. 10C) or the tracking drive is commanded to move the belt back to the center position.

Once the belt has moved away from the sensor correctly, the analog tracking sensor 70 can optionally be calibrated, to correlate the output (volts) as a function of the amount of light incident on the sensor photoreceptor. This calibration can be performed on each power-up, or periodically, or when the need is detected. Nominally for this exemplary embodiment, the PWM is some value, e.g. 15%, to produce an analog tracking sensor output value of 1 volt when the sensor is not blocked by the belt 58, i.e. the "non-blocked" sensor value. If the sensor 70 does not have the expected results, either the analog tracking sensor has failed or the belt moved in the wrong direction (toward the sensor 70 instead of away from the sensor). In this case, an error is reported.

There are some additional optional steps which can be performed. Once the non-blocked value of the tracking sensor 70 is established, the belt tracking motor is commanded to move the belt 58 back toward the sensors. As the belt 58 is advanced, if the belt indicia sensor 72 does not detect single slot spacing within some distance, e.g. one belt revolution, then the belt tracking system is not functioning properly. In this event, the belt drive is stopped, and an error reported.

If the belt tracking function appears to be functioning properly, the belt 58 continues to be driven toward the sensor 70 until the belt indicia sensor 72 detects every other slot. At this point the belt has moved so that the analog tracking sensor 70 is fully blocked by the belt. If the belt indicia sensor 72 continues to detect single slot spacing for more than a predetermined media advance distance, e.g. some number of revolutions of the drive roller 62, then the belt tracking system is not driving the belt toward the sensor 70 correctly. In this event, the belt is stopped, and an error reported.

Once the belt 58 has moved toward the sensor 70 correctly, the analog tracking sensor is calibrated, i.e. the amount of light incident on the sensor versus its output (millivolts). Because the sensor 70 should be fully blocked by the belt, the output should remain at 3.3 volts across the range of the PWM drive on the sensor LED. If the sensor 70 does not have the expected results, either the sensor has failed or the belt 58 moved in the wrong direction (away from the sensor instead of toward the sensor). In this case, an error is reported.

Once the analog tracking sensor has been correctly calibrated, the belt tracking motor is commanded to move the belt back to where the output of the analog tracking sensor is at its mid-point value ((non-blocked value plus blocked value) divided by 2). As the belt is advanced, if the belt indicia sensor does not detect single slot spacing within some distance, e.g. one belt revolution, then the tracking system is not functioning properly. In this event, the belt is stopped by turning off the media advance motor, and an error is reported.

Figure 10C:
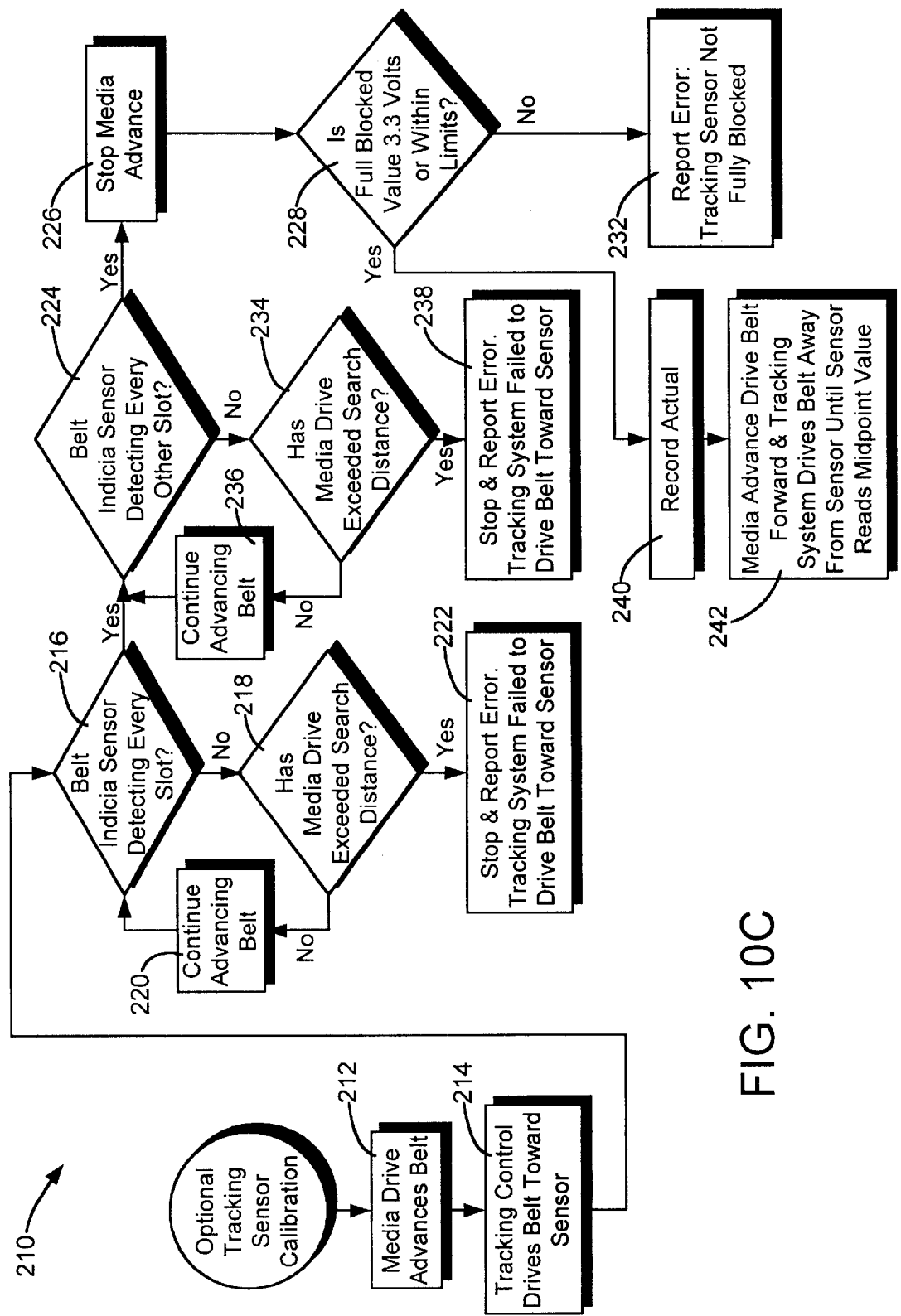
FIG. 10C is a flow diagram illustrating an optional tracking sensor calibration mode.

An exemplary optional calibration routine 210 is illustrated in FIG. 10C. With the belt already positioned well away from the sensor 70, the belt will be driven toward the sensor 70, so that the belt indicia sensor 72 should sense every other slot, then every slot, then every other slot again as the belt is driven toward the sensor 70. Thus, at 212, the media drive is commanded to advance the belt, and at 214, the tracking drive is commanded to drive the belt toward the sensor 70. At 216, if the sensor 72 is detecting every slot, operation proceeds to 224 and 234, to continue to drive the belt toward sensor 70 until every other slot is detected, or until the media drive has exceeded the search distance. If the belt indicia sensor detects every other slot (224), indicating that the belt is blocking the sensor 70, then the media drive motor is stopped (226). If the full blocked sensor value is a predetermined value, here 3.3 volts, or within predetermined limits (e.g. +/−0.1 volt about the predetermined value), then the actual blocked value is recorded (step 240). At 242, the media drive motor advances the belt forward, and the belt tracking motor is commanded to drive the belt away from the tracking sensor until the sensor 70 reads a midpoint or mid-range value, successfully completing the optional calibration process.

If, at 228, the blocked value is not within the predetermined limits, an error is reported at 232, indicating that the tracking sensor is not fully blocked.

If, at step 216 or step 224, the belt indicia sensor does not detect every slot (216), or every other slot (224) within the search distance, then the media drive motor is stopped, and an error is reported (222, 238), indicating that the tracking system has failed to drive the belt toward the sensor.

The system also provides the capability of error detection during normal printer operation. During printer operation, an exemplary desired allowable analog range for the analog tracking sensor 70 is established, say +/−40% about a mid-point value. A shut down limit of the output of the sensor 70 is established for tracking belt movement away from the sensor shut down limit. In an exemplary embodiment, this shut down limit is the non-blocked output value plus ((the blocked value minus the non-blocked value) divided by 10), which for this exemplary embodiment is 1.23 volts.

A shut down limit of the output of the sensor 70 is established for tracking belt movement toward the sensor 70. In the exemplary embodiment, this shut down limit is set to 10% of the operating range above the upper limit, i.e. the blocked output value minus ((the blocked value minus the non-blocked value) divided by 10), which for this exemplary embodiment is 3.07 volts.

Therefore during normal printer operation, the output of the analog tracking sensor 70 is monitored, to keep the belt from running into printer structures in either plus or minus direction.

Between calibrations, if the analog tracking sensor 70 gets covered with ink or paper dust, the nominal center position begins to shift away from the sensor, and thus the belt is driven away from the sensor 70. If the printer goes too long without recalibration, it is possible that the full exposed sensor value could be greater than the calibrated mid-point value. This case would cause the belt to continue to track away from the sensor in an attempt to reach the mid-point value. There are several fail-safes for this condition. Under normal conditions, a smaller value of the analog tracking sensor output should result when the belt is commanded to travel away from the sensor. If after a reasonable advance, the value has not changed, then it can be assumed that either the sensor has failed, the sensor is dirty and thus the minimum value is greater than the previously calibrated mid-point value, or the tracking system has failed. At this point the output of the belt indicia sensor 72 can be evaluated to see if it continues to detect slots every slot spacing. If the belt indicia sensor 72 continues to see slots, then an attempt should be made to recalibrate the analog tracking sensor 70. If the time the LED PWM drive is on reaches 85% to obtain 1 volt output level, a warning message is given to the operator. If the time the LED PWM drive is on reaches 100%, the technician will need to clean or replace the analog tracking sensor.

Another error monitored by the system is that of the analog tracking system failing in an open condition (less than 1 volt), i.e. typically caused by a broken or disconnected wire. The open condition value is less than the "away from the sensor" shut down limit. If this "open condition" is detected, the printer is stopped, and the error reported. As long as the belt indicia sensor is still sensing slots, a re-calibration of the analog tracking sensor could be attempted.

Another error which can be detected is that of the analog tracking sensor failing in a closed condition, i.e. its output greater than 3.3 volts, typical caused by a hardware problem. Here, the closed condition value exceeds the "toward the sensor" shut down limit. If this "closed condition" is detected, the printer is stopped, and the error reported. As long as the belt indicia sensor is still sensing slots, a re-calibration of the analog tracking sensor could be attempted.

Another error monitored by the system is a tracking motor failure. This is sensed when the output value of the analog tracking sensor begins to drift from a desired position and a corresponding signal to the tracking motor fails to produce the expected response (a change in direction back to the mid-point).

Another error which can be monitored by the system is determined by failure to detect a change in state of the belt indicia sensor as the media drive motor is advancing the belt, during power-up or calibration, for some predetermined advance distance. This indicates failure of the belt indicia sensor or some other problem, requiring a technician's attention.

Another error monitored by the system is that of the belt breaking or failing to move forward. If the belt is not moving advancing, it cannot track. If the belt breaks, the media drive system should detect that the belt indicia sensor is not seeing the slots. Even if the message does not come from the media drive system, the belt tracking system could detect that the belt indicia sensor is not seeing the slots.

Figure 10D:
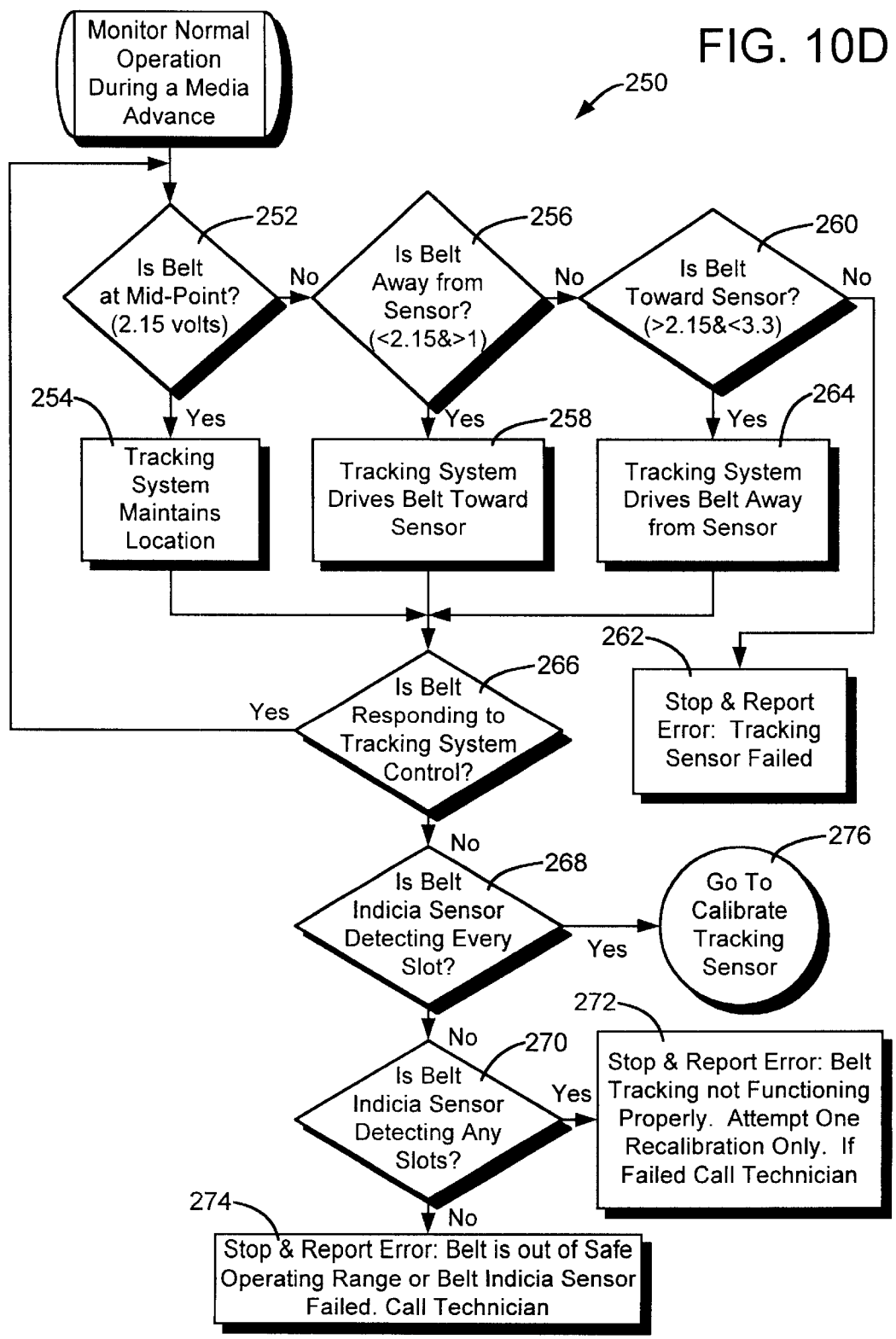
FIG. 10D illustrates an exemplary routine for monitoring the belt tracking during normal operation of the printing system.

FIG. 10D illustrates an exemplary routine 250 for monitoring the belt tracking during normal operation of the printing system. At 252, the tracking sensor output is checked to determine if its output is at mid-point of its range, in this example, 2.15 volts. If so, the tracking system maintains the current lateral location of the belt. If the sensor output is not at its mid-point value, then at 256, a decision is made to determine whether the lateral position of the belt is away from the sensor, i.e. if the sensor output is less than 2.15 volts and greater than 1 volt. If yes, the tracking system drives the belt toward the sensor at 258. If at 260 the lateral position of the belt is toward from the sensor, the tracking system drives the belt away from the sensor (264). If at 260, the tracking sensor voltage is out of range, then the belt drive is stopped, and an error is reported, indicating that the tracking sensor has failed (262).

Referring to step 266, reached from any of steps 254, 258, 264, if the belt is responding to the tracking system control, operation branches back to step 252. If belt is not responding to the tracking system control (at 266), a determination is made as to whether the belt indicia sensor 72 is detecting every slot. If so, operation proceeds to the tracking sensor calibration routine (FIG. 10B). If not, operation proceeds to 270, to determine if the belt indicia sensor is detecting any slots. If not, at 274, operation is stopped, and an error is reported, indicating that the belt is out of a safe operating range or that the belt indicia sensor has failed, and that a technician should be called. If the belt indicia sensor is detecting some slots, operation is stopped at 272, and an error is reported, indicating that the belt tracking function is not functioning properly. One tracking sensor recalibration can be attempted, and if this fails to correct the error, a technician should be called.

The following state table summarizes several different system states, and the tracking and belt indicia sensors.

State Table for Tracking Sensor and Belt Indicia Sensor

| Belt Indicia Sensor | Tracking Sensor Output | State |
| --- | --- | --- |
| States 1, 5: Sensing every Slot | In desired operation range | System normal |
| State 2: Sensing every Slot | Above desired operation range, but below maximum | Auto re-cal |
| State 3: Sensing every other Slot | At maximum | Notify operator, possibly attempt re-cal |
| State 4: No longer sensing slots | At maximum | System shut down |
| State 6: Sensing every Slot | Below desired operation range, but above minimum | Auto re-cal |
| State 7: Sensing every other Slot | At minimum | Notify operator, possibly attempt re-cal |
| State 8: No longer sensing slots | At minimum | System shut down |

Figure 4A:
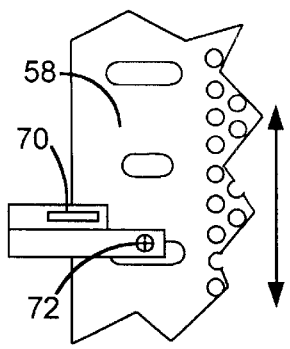
Figure 5A:
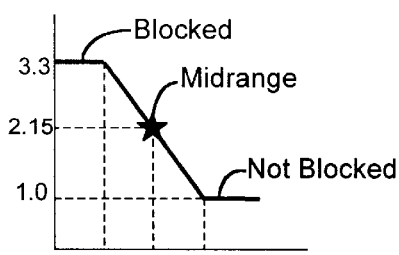
Figure 6A:
Figure 4B:
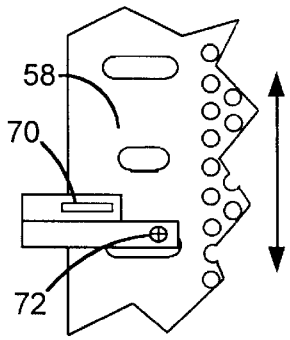
Figure 5B:
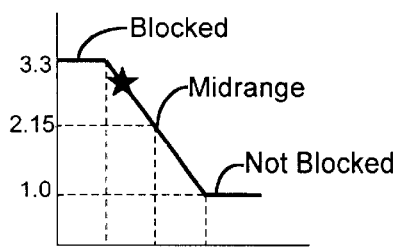
Figure 6B:
Figure 4C:
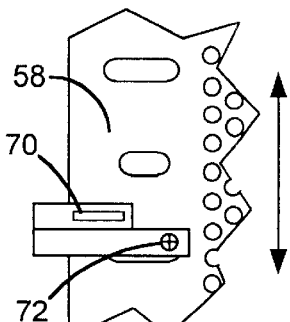
Figure 5C:
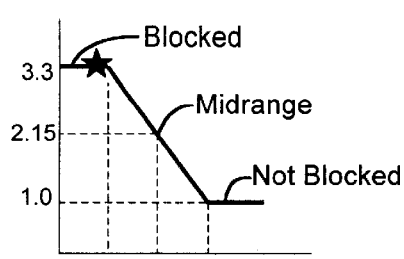
Figure 6C:
Figure 4D:
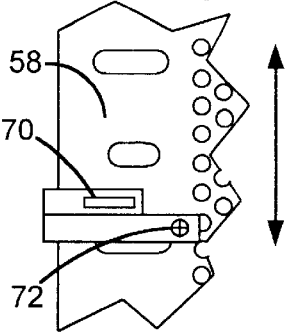
Figure 5D:
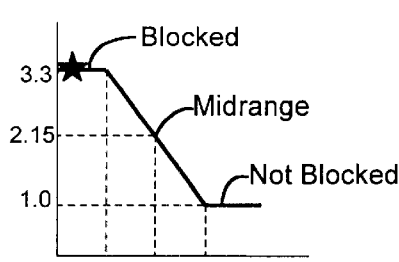
Figure 6D:

The eight states summarized in this table are illustrated in FIGS. 4A–6H, which shows eight exemplary positions of the belt in relation to the sensors 70, 72, and the corresponding values of the outputs of the sensors for these positions. In FIG. 4A, the edge of the belt is centered on the analog tracking sensor 70, and the output of the sensor is in the desired range, at 2.15 V in this example. The belt indicia sensor is sensing both slots, as illustrated in FIG. 6A. FIGS. 4B–4D show the belt in successive positions as it traverses or tracks laterally toward the sensors, i.e. toward the left in the plane of FIGS. 4B–4D. Thus, state 2 shown in FIG. 4B results in the tracking sensor having an output above the desired range, but still less than the maximum output, and the belt indicia sensor still sensing each slot. In this condition, the system automatically performs a recalibration of the analog tracking sensor 70. State 3 shown in FIG. 4C shows the belt has moved even further to the left, and now the tracking sensor output is at its maximum value, with the belt indicia sensor sensing only the wide slots. In this condition, the operator is notified, and a recalibration of the tracking sensor can be attempted. State 4 of FIG. 4D shows the belt has moved even further to the left, and now the belt indicia sensor does not detect any slots, with the tracking sensor output still at its maximum level. In this state, the system is shut down as a protective measure.

States 5–8 are illustrated in FIGS. 4E–4H. Consider that the belt has moved from the left back to the centered condition, with the edge of the belt centered on the analog tracking sensor. This state is thus the same as state 1. Now the belt tracks to the right, away from the sensors. State 6 shown in FIG. 4F is a state where the edge of the belt is shifted to the right, but is still positioned within the field of view of the tracking sensor. The tracking sensor output is below the desired midrange value, but above the minimum value. The belt indicia sensor is detecting every slot as shown in FIG. 6F. In this condition, the system automatically performs a recalibration of the analog tracking sensor. State 7 shown in FIG. 4G has the belt edge moved further to the right, out of view of the tracking sensor 70. Now the tracking sensor is not blocked at all, and its output is at its minimum. The belt indicia sensor is positioned to sense only the wide slots. In this condition, the operator is notified, and a recalibration may optionally be attempted. FIG. 4H shows state 8, with the belt edge moved even further to the right, with the belt indicia sensor not detecting any slots, and the tracking sensor output still at its minimum value. In this condition, the system is shut down as a protective measure.

While the belt 58 has been described with alternating wide and narrow slots, the invention is not limited to a belt with this particular slot arrangement. Other slot or indicia configurations can alternatively be employed. For example, a triangular slot shape can be employed. This alternate shape is illustrated in FIG. 7, as slot 58D; in this alternate embodiment, a series of triangular slots are arranged along the edge of the belt. The outputs of the sensors 70 and 72 for belt positions similar to those shown in FIGS. 4E–4H are shown in FIGS. 8A–8D and 9A–9D, respectively. The tracking sensor output is the same as shown in FIGS. 5E–5H. The slot width seen by the belt indicia sensor continuously varies as the belt tracks horizontally, resulting in the sensor outputs shown successively in FIGS. 9A–9D.

While the embodiments disclosed above employ an analog tracking sensor 70, the sensor could alternatively have a digital output. Moreover, the triangular slot disclosed above could be employed with a digital belt indicia sensor, to provide multiple sensor output levels depending on the relative lateral position of the triangular slots relative to the sensor, and eliminate the need for a separate tracking sensor. In another variation, the belt indicia and belt indicia sensor can be placed on the belt edge opposite the tracking sensor. In yet another variation, a triangular slot indicia pattern can be placed along one belt edge for sensing by a tracking sensor, and an alternating slot pattern placed along the opposite belt edge for sensing by a belt indicia sensor.

The belt indicia sensor 72 can provide other functions and advantages. In accordance with another aspect of the invention, the printer 50 further includes a media drive calibration function that allows precise calibration of the media drive system. The belt indicia sensor 72 according to this aspect can be used by the media advance calibration function to detect the slots 58B, 58C in the belt. These slots are accurately etched into the belt every ½ inch in this exemplary embodiment, which in this exemplary embodiment is fabricated from a material with a very low coefficient of thermal expansion, such that any thermal variations in the media advance system can be assumed to be due to changes in the diameter of the belt rollers 60, 62. As the rollers 60, 62 change size with temperature variations, the media drive encoder 77 measures more or less pulses between detection by sensor 72 of slots on the belt. The number of pulses between detection of slots can be used to detect changes in the diameter of rollers 60, 62 and determine the associated media feed error. Moreover, the belt indicia sensor is used to calibrate eccentricity in the media drive encoder 77 and roller 62. With multiple revolutions of the roller 62 and belt 58, different portions of the media drive encoder 77 are used to measure the same slot spacing. Thus there will be more or less encoder pulses for the same fixed distance. These variations can be plotted versus angle of roller/encoder to measure the eccentricity of the roller/encoder. This optional technique eliminates the need for use of a separate calibration sheet.

FIG. 11A illustrates an exemplary media drive calibration routine 300. At 302, the belt is advanced to a home location, and the encoder 77 is reset at 304. The belt is advanced slowly at 306, and the number of encoder pulses between slots is stored at 308. Once a predetermined number of values has been stored for each slot spacing, e.g. four values in this exemplary embodiment (step 310), then media drive scale and eccentricity compensation values are calculated from the slot spacing values (312). These values are stored at 314 for used during normal system operation by the media drive calibration monitor routine 320 (FIG. 11B).

The media drive calibration monitor 320 (FIG. 11B) compensates for variations in the roller diameters resulting from temperature variations. During system operation, this routine runs in the background. At 322 (FIG. 11B), the system has been tracking the number of encoder counts between slots, and if this number is the same as the number of stored counts, no calibration is needed, and operation returns. If not, the scale factor is modified at 324 to compensate for changes in roller diameter, depending on the measured number of encoder counts between slot detection. At 326, the new scale factor is stored, and applied to the media drive system to accurately move the belt.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A belt tracking system for an endless belt mounted on a roller system, the belt having left and right opposed edges, the belt driven in a first direction by a belt drive system, the tracking system comprising;
    a set of periodic belt indicia formed on the belt along one or more axes aligned with the first direction;
    a sensor system to provide a first sensor signal for tracking movement of the belt in a lateral direction transverse to said first direction and for sensing the set of periodic belt indicia to provide a second sensor signal for detecting that the belt has tracked outside an allowable lateral belt movement range;
    an actuator system for effecting movement of the belt in said lateral direction, the actuator system responsive to the first sensor signal for nominally maintaining a position of the belt relative to the transverse direction;
    a controller responsive to the second sensor signal and taking protective actions to prevent the belt from damage due to undesired lateral tracking movement.

2. The system of claim 1 wherein the set of periodic belt indicia includes a set of triangularly shaped slots having a width dimension in said lateral direction which varies from a top of the slot to a bottom of the slot.

3. A belt tracking system for an endless belt mounted on a roller system, the belt having left and right opposed edges, the belt driven in a first direction by a belt drive system, the tracking system comprising;
    a set of periodic belt indicia formed on the belt along one or more axes aligned with the first direction;
    a sensor system to provide a first sensor signal for tracking movement of the belt in a lateral direction transverse to said first direction and for sensing the set of periodic belt indicia to provide a second sensor signal for detecting that the belt has tracked outside an allowable lateral belt movement range;
    an actuator system for effecting movement of the belt in said lateral direction, the actuator system responsive to the first sensor signal for nominally maintaining a position of the belt relative to the transverse direction;
    a controller responsive to the second sensor signal and taking protective actions to prevent the belt from damage due to undesired lateral tracking movement;
    wherein the set of belt indicia includes a set of slots having a predetermined dimension in said lateral direction representing said allowable belt movement range.

4. The system of claim 3 wherein said sensor system includes a first stationary sensor for tracking said one of said left and right edges and providing the first sensor signal, and a second stationary sensor for sensing said slots and providing the second sensor signal.

5. A belt tracking system for an endless belt mounted on a roller system, the belt having left and right opposed edges, the belt driven in a first direction by a belt drive system, the tracking system comprising;
    a set of periodic belt indicia formed on the belt along one or more axes aligned with the first direction;
    a sensor system for tracking movement of the belt in a lateral direction transverse to said first direction and for sensing the set of belt indicia to provide sensor system signals;
    an actuator system for effecting movement of the belt in said lateral direction, the actuator system responsive to the sensor system signals for nominally maintaining a position of the belt relative to the transverse direction;
    a controller responsive to the sensor system signals for detecting that the belt has tracked outside an allowable belt movement range and taking protective actions to prevent the belt from damage due to undesired lateral tracking movement;
    a second set of belt indicia including one of said left and right edges;
    wherein the set of periodic belt indicia includes a set of slots having a predetermined dimension in said lateral direction representing said allowable belt range, and said sensor system includes a first stationary sensor for tracking said one of said left and right edges and providing a first sensor signal, and a second stationary sensor for sensing said slots and providing a second sensor signal; and
    wherein the set of belt indicia includes another set of slots having a dimension in said lateral direction representing a usable range of the first sensor, slots of said another set of slots alternating with slots of said set of slots, and the controller is responsive to said second sensor signal to generate a fault condition when the second sensor signal indicates that the belt has moved outside the usable range of the first sensor.

6. A belt tracking system for an endless belt mounted on a roller system, the belt having left and right opposed edges, the belt driven in a first direction by a belt drive system, the tracking system comprising;
    a tracking sensor for monitoring a first belt indicia indicating movement of the belt in a lateral direction transverse to said first direction and generating a tracking sensor signal;
    an actuator for effecting movement of the belt in said lateral direction in response to actuator drive signals, the tracking sensor and the actuator connected for nominally maintaining a position of the belt relative to the transverse direction;
    a belt indicia sensor for sensing a second belt indicia located inwardly of the belt edges and generating a belt indicia signal indicative of lateral motion of the belt away from the nominal position;
    a controller responsive to the tracking sensor signal and the belt indicia signal for detecting fault conditions and taking protective actions under predetermined fault conditions to prevent the belt from damage due to undesired lateral tracking movement.

7. The system of claim 6, wherein said tracking sensor comprises an optical sensor comprising a light source and a photoreceptor, the belt having first and second opposed surfaces, and wherein the tracking sensor is positioned at a nominal position of said first edge belt edge, such that the light source is positioned adjacent the first surface and the photoreceptor is positioned adjacent the second surface, wherein the belt when tracked laterally in a direction away from the tracking sensor results in a fully non-blocked sensor condition, and the belt when tracked laterally in a direction toward the tracking sensor results in a fully blocked sensor condition.

8. The system of claim 7, wherein said controller is further operable in a calibration mode for calibrating said tracking sensor, and said belt indicia signal is used to calibrate said tracking signal.

9. The system of claim 6, wherein values of the belt indicia signal is indicative of lateral motion of the belt away from the nominal position.

10. The system of claim 6 wherein the controller is responsive to the belt indicia signal while the belt is being driven to disable operation of the belt drive system when the belt indicia signal indicates that the belt has laterally traversed more than a predetermined first distance from the nominal position.

11. The system of claim 6 wherein said protective actions include a recalibration of said tracking sensor.

12. The system of claim 6 wherein said protective actions include a warning to an operator.

13. The system of claim 6 wherein said protective actions include disabling the belt drive system.

14. A belt tracking system for an endless belt mounted on a roller system, the belt having left and right opposed edges, the belt driven in a first direction by a belt drive system, the tracking system comprising;
  a tracking sensor for monitoring a first belt indicia indicating movement of the belt in a lateral direction transverse to said first direction and generating a tracking sensor signal;
  an actuator for effecting movement of the belt in said lateral direction in response to actuator drive signals, the tracking sensor and the actuator connected for nominally maintaining a position of the belt relative to the transverse direction;
  a belt indicia sensor for sensing a second belt indicia located inwardly of the belt edges and generating a belt indicia signal;
  a controller responsive to the tracking sensor signal and the belt indicia signal for detecting fault conditions and taking protective actions under predetermined fault conditions to prevent the belt from damage due to undesired lateral tracking movement;
  wherein the controller is responsive to the belt indicia signal while the belt is being driven to disable operation of the belt drive system when the belt indicia signal indicates that the belt has laterally traversed more than a predetermined first distance from the nominal position, and to issue a warning to an operator when the belt indicia signal indicates that the belt has laterally traversed more than a second predetermined distance from the nominal position, said second distance less than said first distance.

15. A belt tracking system for an endless belt mounted on a roller system, the belt having left and right opposed edges, the belt driven in a first direction by a belt drive system, the tracking system comprising;
  a tracking sensor for monitoring a first belt indicia indicating movement of the belt in a lateral direction transverse to said first direction and generating a tracking sensor signal;
  an actuator for effecting movement of the belt in said lateral direction in response to actuator drive signals, the tracking sensor and the actuator connected for nominally maintaining a position of the belt relative to the transverse direction;
  a belt indicia sensor for sensing a second belt indicia located inwardly of the belt edges and generating a belt indicia signal;
  a controller responsive to the tracking sensor signal and the belt indicia signal for detecting fault conditions and taking protective actions under predetermined fault conditions to prevent the belt from damage due to undesired lateral tracking movement;
  wherein the controller is responsive to the belt indicia signal while the belt is being driven to disable operation of the belt drive system when the belt indicia signal indicates that the belt has laterally traversed more than a predetermined first distance from the nominal position; and
  wherein said second belt indicia comprises alternating wide and narrow slots disposed transverse to said first direction.

16. The system of claim 15 wherein the controller is responsive to the belt indicia signal while the belt is being driven to disable operation of the belt drive system when neither slot is being detected, indicating that the belt has laterally traversed more than a predetermined allowable first distance from the nominal position.

17. The system of claim 16 wherein the controller is responsive to the belt indicia signal while the belt is being driven to issue a warning to an operator when only alternating slots are being detected, indicating that the belt has laterally traversed more than a second predetermined distance from the nominal position, said second distance less than said first distance.

18. A belt tracking system for an endless belt mounted on a roller system, the belt having left and right opposed edges, the belt driven in a first direction by a belt drive system, the tracking system comprising;
  a tracking sensor for monitoring a first belt indicia indicating movement of the belt in a lateral direction transverse to said first direction and generating a tracking sensor signal;
  an actuator for effecting movement of the belt in said lateral direction in response to actuator drive signals, the tracking sensor and the actuator connected for nominally maintaining a position of the belt relative to the transverse direction;
  a belt indicia sensor for sensing a second belt indicia located inwardly of the belt edges and generating a belt indicia signal;
  a controller responsive to the tracking sensor signal and the belt indicia signal for detecting fault conditions and taking protective actions under predetermined fault conditions to prevent the belt from damage due to undesired lateral tracking movement;
  wherein said fault conditions include a condition that said belt drive system has failed.

19. A belt tracking system for an endless belt mounted on a roller system, the belt having left and right opposed edges, the belt driven in a first direction by a belt drive system, the tracking system comprising;
  a tracking sensor for monitoring a first belt indicia indicating movement of the belt in a lateral direction transverse to said first direction and generating a tracking sensor signal;

an actuator for effecting movement of the belt in said lateral direction in response to actuator drive signals, the tracking sensor and the actuator connected for nominally maintaining a position of the belt relative to the transverse direction;

a belt indicia sensor for sensing a second belt indicia located inwardly of the belt edges and generating a belt indicia signal;

a controller responsive to the tracking sensor signal and the belt indicia signal for detecting fault conditions and taking protective actions under predetermined fault conditions to prevent the belt from damage due to undesired lateral tracking movement;

wherein said fault conditions include a condition that said belt has broken.

20. A belt tracking system for an endless belt mounted on a roller system, the belt having left and right opposed edges, the belt driven in a first direction by a belt drive system, the tracking system comprising;

a tracking sensor for monitoring a first belt indicia indicating movement of the belt in a lateral direction transverse to said first direction and generating a tracking sensor signal;

an actuator for effecting movement of the belt in said lateral direction in response to actuator drive signals, the tracking sensor and the actuator connected for nominally maintaining a position of the belt relative to the transverse direction;

a belt indicia sensor for sensing a second belt indicia located inwardly of the belt edges and generating a belt indicia signal;

a controller responsive to the tracking sensor signal and the belt indicia signal for detecting fault conditions and taking protective actions under predetermined fault conditions to prevent the belt from damage due to undesired lateral tracking movement;

wherein said fault conditions includes a failure of said tracking sensor.

21. A belt tracking system for an endless belt mounted on a roller system, the belt having left and right opposed edges, the belt driven in a first direction by a belt drive system, the tracking system comprising;

a tracking sensor for monitoring a first belt indicia indicating movement of the belt in a lateral direction transverse to said first direction and generating a tracking sensor signal;

an actuator for effecting movement of the belt in said lateral direction in response to actuator drive signals, the tracking sensor and the actuator connected for nominally maintaining a position of the belt relative to the transverse direction;

a belt indicia sensor for sensing a second belt indicia located inwardly of the belt edges and generating a belt indicia signal;

a controller responsive to the tracking sensor signal and the belt indicia signal for detecting fault conditions and taking protective actions under predetermined fault conditions to prevent the belt from damage due to undesired lateral tracking movement.

wherein said fault conditions include failure of said belt indicia sensor.

22. A belt tracking system for an endless belt mounted on a roller system, the belt having left and right opposed edges, the belt driven in a first direction by a belt drive system, the tracking system comprising;

a tracking sensor for monitoring a first belt indicia indicating movement of the belt in a lateral direction transverse to said first direction and generating a tracking sensor signal;

an actuator for effecting movement of the belt in said lateral direction in response to actuator drive signals, the tracking sensor and the actuator connected for nominally maintaining a position of the belt relative to the transverse direction;

a belt indicia sensor for sensing a second belt indicia located inwardly of the belt edges and generating a belt indicia signal;

a controller responsive to the tracking sensor signal and the belt indicia signal for detecting fault conditions and taking protective actions under predetermined fault conditions to prevent the belt from damage due to undesired lateral tracking movement; and wherein said tracking sensor comprises an optical sensor comprising a light source and a photoreceptor, the belt having first and second opposed surfaces, and wherein the tracking sensor is positioned at a nominal position of said first edge belt edge, such that the light source is positioned adjacent the first surface and the photoreceptor is positioned adjacent the second surface, wherein the belt when tracked laterally in a direction away from the tracking sensor results in a fully non-blocked sensor condition, and the belt when tracked laterally in a direction toward the tracking sensor results in a fully blocked sensor condition; and wherein said controller is further operable in a calibration mode for calibrating said tracking sensor, and said belt indicia signal is used to calibrate said tracking signal; and wherein said second belt indicia includes a set of slots having a width representing a usable range of said tracking sensor, and wherein said controller is operable during said calibration mode to move the belt laterally away from the tracking sensor until said belt indicia sensor no longer detects said slots while said belt is driven in said first direction, and varying an intensity of light produced by said light source to produce a predetermined sensor output value for the fully non-blocked sensor condition.

23. The system of claim 22, wherein said controller generates a fault signal if said intensity of light exceeds a predetermined threshold.

24. A media handling system comprising:

an endless belt mounted on a roller system;

a belt drive system for driving the belt in a media advancing direction;

a plurality of slots formed in the endless belt, the slots spaced apart by a slot pitch in the media advancing direction, the slots having a longitudinal extent transverse to the media advancing direction;

a tracking sensor fixed mounted in relation to the belt for detecting an edge of the belt and generating a tracking sensor signal;

a belt slot sensor responsive to the slots to provide a belt sensor signal for detecting that the belt has tracked outside an allowable lateral belt movement range;

a controller responsive to the tracking sensor signal and the belt sensor signal to monitor error conditions, said error conditions including a condition that the belt is tracking away from a nominal location in a direction transverse to said media advancing direction.

25. The system of claim 24 wherein said plurality of slots include alternating long and short slots.

26. A media handling system comprising:
an endless belt mounted on a roller system;
a belt drive system for driving the belt in a media advancing direction;
a plurality of slots formed in the endless belt, the slots spaced apart by a slot pitch in the media advancing direction, the slots having a longitudinal extent transverse to the media advancing direction;
a tracking sensor fixed mounted in relation to the belt for detecting an edge of the belt and generating a tracking sensor signal;
a belt slot sensor responsive to the slots to provide a belt sensor signal;
a controller responsive to the tracking sensor signal and the belt sensor signal to monitor error conditions, said error conditions including a condition that the belt is tracking away from a nominal location in a direction transverse to said media advancing direction;
wherein said error conditions further includes a condition that said belt drive system has failed.

27. A media handling system comprising:
an endless belt mounted on a roller system;
a belt drive system for driving the belt in a media advancing direction;
a plurality of slots formed in the endless belt, the slots spaced apart by a slot pitch in the media advancing direction, the slots having a longitudinal extent transverse to the media advancing direction;
a tracking sensor fixed mounted in relation to the belt for detecting an edge of the belt and generating a tracking sensor signal;
a belt slot sensor responsive to the slots to provide a belt sensor signal;
a controller responsive to the tracking sensor signal and the belt sensor signal to monitor error conditions, said error conditions including a condition that the belt is tracking away from a nominal location in a direction transverse to said media advancing direction;
wherein said error conditions further includes a condition that said belt has broken.

28. A media handling system comprising:
an endless belt mounted on a roller system;
a belt drive system for driving the belt in a media advancing direction;
a plurality of slots formed in the endless belt, the slots spaced apart by a slot pitch in the media advancing direction, the slots having a longitudinal extent transverse to the media advancing direction;
a tracking sensor fixed mounted in relation to the belt for detecting an edge of the belt and generating a tracking sensor signal;
a belt slot sensor responsive to the slots to provide a belt sensor signal;
a controller responsive to the tracking sensor signal and the belt sensor signal to monitor error conditions, said error conditions including a condition that the belt is tracking away from a nominal location in a direction transverse to said media advancing direction;
wherein said error condition further includes a failure of said tracking sensor.

29. A media handling system comprising:
an endless belt mounted on a roller system;
a belt drive system for driving the belt in a media advancing direction;
a plurality of slots formed in the endless belt, the slots spaced apart by a slot pitch in the media advancing direction, the slots having a longitudinal extent transverse to the media advancing direction;
a tracking sensor fixed mounted in relation to the belt for detecting an edge of the belt and generating a tracking sensor signal;
a belt slot sensor responsive to the slots to provide a belt sensor signal for detecting that the belt has tracked outside an allowable lateral belt movement range;
a controller responsive to the tracking sensor signal and the belt sensor signal to monitor error conditions, said error conditions including a condition that the belt is tracking away from a nominal location in a direction transverse to said media advancing direction;
wherein said controller is further operable in a calibration mode for calibrating said tracking sensor, and said belt sensor signal is used to calibrate said tracking signal.

30. A method for calibrating a belt drive system for an endless belt mounted on a roller system, the belt having left and right opposed edges, the belt driven in a first direction by a belt drive system, the method comprising:
while driving the belt in said first direction, monitoring a drive encoder generating pulses indicating movement of a belt drive element and monitoring a belt sensor signal sensing a set of belt indicia on said belt;
calculating a set of calibration values in dependence on said drive sensor signal.

31. A belt tracking system for a belt mounted on a roller system, the belt having left and right opposed edges, the belt driven in a first direction by a belt drive system, the tracking system comprising;
a set of periodic belt indicia formed on the belt along one or more axes aligned with the first direction;
a sensor system to provide a first sensor signal for tracking movement of the belt in a lateral direction transverse to said first direction and for sensing the set of periodic belt indicia to provide a second sensor signal for detecting that the belt has tracked outside an allowable lateral belt movement range;
an actuator system for effecting movement of the belt in said lateral direction, the actuator system responsive to the first sensor signal for nominally maintaining a position of the belt relative to the transverse direction;
a controller responsive to the second sensor signal and taking protective actions to prevent the belt from damage due to undesired lateral tracking movement.

32. A belt tracking system for a belt mounted on a roller system, the belt having left and right opposed edges, the belt driven in a first direction by a belt drive system, the tracking system comprising;
a tracking sensor for monitoring a first belt indicia indicating movement of the belt in a lateral direction transverse to said first direction and generating a tracking sensor signal;
an actuator for effecting movement of the belt in said lateral direction in response to actuator drive signals, the tracking sensor and the actuator connected for nominally maintaining a position of the belt relative to the transverse direction;

a belt indicia sensor for sensing a second belt indicia located inwardly of the belt edges and generating a belt indicia signal;

a controller responsive to the tracking sensor signal and the belt indicia signal for detecting fault conditions and taking protective actions under predetermined fault conditions to prevent the belt from damage due to undesired lateral tracking movement;

wherein the controller is responsive to the belt indicia signal while the belt is being driven to disable operation of the belt drive system when the belt indicia signal indicates that the belt has laterally traversed more than a predetermined first distance from the nominal position, and to issue a warning to an operator when the belt indicia signal indicates that the belt has laterally traversed more than a second predetermined distance from the nominal position, said second distance less than said first distance.

* * * * *